US008740620B2

(12) United States Patent
Dohring et al.

(10) Patent No.: US 8,740,620 B2
(45) Date of Patent: Jun. 3, 2014

(54) LANGUAGE TEACHING SYSTEM THAT FACILITATES MENTOR INVOLVEMENT

(75) Inventors: Doug Dohring, Glendale, CA (US); William McCaffrey, Glendale, CA (US)

(73) Assignee: Age of Learning, Inc., Glendale, CA (US)

( * ) Notice: Subject to any disclaimer, the term of this patent is extended or adjusted under 35 U.S.C. 154(b) by 0 days.

(21) Appl. No.: 13/301,639

(22) Filed: Nov. 21, 2011

(65) Prior Publication Data
US 2013/0130210 A1 May 23, 2013

(51) Int. Cl.
*G09B 19/06* (2006.01)
(52) U.S. Cl.
USPC .......................................................... 434/157
(58) Field of Classification Search
USPC ................... 434/156, 157, 169, 178
See application file for complete search history.

(56) References Cited

U.S. PATENT DOCUMENTS

| 5,429,513 | A | 7/1995 | Diaz-Plaza |
| 6,331,115 | B1 | 12/2001 | Jenkins et al. |
| 6,604,947 | B1 | 8/2003 | Rai |
| 7,200,581 | B2 * | 4/2007 | Taggart et al. .................. 706/46 |
| 7,421,391 | B1 * | 9/2008 | Merkel ........................ 704/270 |
| 7,524,191 | B2 | 4/2009 | Marmorstein et al. |
| 2002/0029146 | A1 | 3/2002 | Nir |
| 2002/0094511 | A1 | 7/2002 | Li |
| 2002/0160341 | A1 | 10/2002 | Yamada et al. |
| 2004/0152054 | A1 * | 8/2004 | Gleissner et al. ............. 434/156 |
| 2005/0048449 | A1 * | 3/2005 | Marmorstein et al. ........ 434/157 |
| 2005/0052405 | A1 | 3/2005 | Maulik et al. |
| 2006/0073462 | A1 | 4/2006 | Tetreault |
| 2006/0093996 | A1 | 5/2006 | Goldman et al. |
| 2007/0048699 | A1 | 3/2007 | MacGregor et al. |
| 2007/0099158 | A1 | 5/2007 | Moran et al. |
| 2007/0224578 | A1 | 9/2007 | De Ley et al. |
| 2008/0070203 | A1 | 3/2008 | Franzblau |
| 2008/0077388 | A1 | 3/2008 | Nash et al. |
| 2008/0160487 | A1 | 7/2008 | Fairfield et al. |

(Continued)

FOREIGN PATENT DOCUMENTS

JP   2001-337595   12/2001
KR   10-2002-0045757   6/2002

(Continued)

OTHER PUBLICATIONS

Levis J. et al., "Integrating Pronunciation into ESL/EFL Classrooms," TESOL Journal, vol. 12, No. 2, pp. 13-19.

(Continued)

*Primary Examiner* — Robert J Utama
*Assistant Examiner* — Sadaruz Zaman
(74) *Attorney, Agent, or Firm* — Wilson, Sonsini, Goodrich & Rosati

(57) ABSTRACT

Disclosed herein, in certain embodiments, are computer-based language immersion teaching systems, products, programs, and methods comprising a digital processing device and a computer program that creates a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language.

16 Claims, 2 Drawing Sheets

(56) References Cited

U.S. PATENT DOCUMENTS

| | | | |
|---|---|---|---|
| 2008/0182230 A1 | 7/2008 | Stone | |
| 2008/0206724 A1 | 8/2008 | Volden | |
| 2008/0280269 A1 | 11/2008 | Yeung et al. | |
| 2008/0294433 A1 | 11/2008 | Yeung et al. | |
| 2009/0061398 A1 | 3/2009 | Keim et al. | |
| 2009/0098524 A1 | 4/2009 | Walton | |
| 2009/0204406 A1 | 8/2009 | Keim et al. | |
| 2009/0307203 A1 | 12/2009 | Keim et al. | |
| 2009/0317776 A1* | 12/2009 | Keim et al. | 434/157 |
| 2010/0081115 A1* | 4/2010 | Harding et al. | 434/157 |
| 2010/0143873 A1* | 6/2010 | Keim et al. | 434/156 |
| 2010/0143874 A1 | 6/2010 | Keim et al. | |
| 2010/0248194 A1 | 9/2010 | Renduchintala et al. | |
| 2010/0323332 A1 | 12/2010 | Keim et al. | |
| 2011/0014595 A1 | 1/2011 | Birr | |
| 2011/0027762 A1 | 2/2011 | Keim et al. | |
| 2011/0053123 A1 | 3/2011 | Lonsdale | |
| 2011/0065082 A1* | 3/2011 | Gal et al. | 434/365 |
| 2011/0104646 A1 | 5/2011 | Harte | |
| 2012/0164609 A1 | 6/2012 | Kehoe | |
| 2013/0059276 A1 | 3/2013 | Allen et al. | |
| 2013/0130211 A1 | 5/2013 | Dohring et al. | |
| 2013/0130212 A1 | 5/2013 | Dohring et al. | |

FOREIGN PATENT DOCUMENTS

| | | |
|---|---|---|
| KR | 10-2003-0049791 | 6/2003 |
| KR | 10-2004-0065593 | 7/2004 |
| KR | 10-0791024 | 1/2008 |
| KR | 10-2009-0089504 | 8/2009 |

OTHER PUBLICATIONS

Rosetta Stone, http://www.rosettastone.com/schools, Accessed Mar. 3, 2011.
Tell Me More, http://www.tellmemore.com/, Accessed Mar. 3, 2011.
Cocinella, http://www.3dlanguage.net/, Accessed Mar. 3, 2011.
eBerlitz, http://www.berlitz.us/, Accessed Mar. 3, 2011.
Scientifice Learning Progress Tracker, http://www.scilearn.com/products/fast-forward-lauguage-series/, Accessed Mar. 3, 2011.
Byki Software, http://www.transparent.com/education/byki-online.html, Accessed Mar. 3, 2011.
Babbel Learning, http://www.babbel.com/, Accessed Mar. 3, 2011.
Mango Languages, http://www.mangolanguages.com/, Accessed Mar. 3, 2011.
PCT/US2012/065936 International Search Report dated Mar. 25, 2013.
U.S. Appl. No. 13/301,660 Office Action dated Jul. 17, 2013.
U.S. Appl. No. 13/301,668 Final Action dated, May 21, 2013.
U.S. Appl. No. 13/301,668 Office Action dated Jan. 25, 2013.

* cited by examiner

LANGUAGE TEACHING SYSTEM THAT FACILITATES MENTOR INVOLVEMENT

BACKGROUND OF THE INVENTION

Interest in and support for language study has strengthened in recent years due to the growing recognition that proficiency in more than one language benefits both individual learners and society. For the individual language learner, research has found a positive link between second language proficiency and cognitive and academic ability. In addition to developing a lifelong ability to communicate with people from other countries and backgrounds, individual benefits include improved overall school performance, superior problem-solving skills, and enhanced creativity and cognitive flexibility. Bamford, K. W., et al. (1991). Additive-bilingual (immersion) education: Cognitive and language development. Language Learning, 41:413-429; Hakuta, K. (1986). Mirror of language. New York: Basic Books.

From a societal perspective, a multilingual workforce enhances economic competitiveness and promotes tolerance and intercultural awareness. Americans fluent in other languages improve global communication and enhance U.S. economic competitiveness abroad. Center for Applied Linguistics (2004): Why, How, and When Should My Child Learn a Second, available at http://www.cal.org/resources/pubs/whyhowwhen_brochure.pdf. As a result, students of foreign languages often have better career opportunities. This is especially true for those learning English as an additional or foreign language. While English is the third most natively spoken language in the world, after Mandarin Chinese and Spanish, English has become the leading language of international discourse, including business and scientific discourse, and has acquired use as lingua franca in many regions. Crystal, D. (1997). English as a Global Language. Cambridge: Cambridge University Press; Wardhaugh, R. (2006). An introduction to sociolinguistics. Wiley-Blackwell.

SUMMARY OF THE INVENTION

In order to learn a language and develop native-like pronunciation, a language learner should have extensive opportunities to see, hear, and pronounce the sounds, often referred to as phonemes, of a target language. Immersive educational environments offer deep exposure to the sounds of a new language and are often recommended. In such environments, text and voiceover audio in the target language is optionally used for instruction, correction, encouragement, and/or navigation as well as for the content of subject material.

In educational environments, including language immersion environments, mentors provide expertise to less experienced individuals to help them enhance their learning. Mentors can help inject cultural context into learning content, provide motivation and encouragement, and provide the insight necessary to customize the learning experience to support each learner's goals, interests, and learning style. However, language immersion teaching environments often discourage mentors, who are not necessarily proficient in the target language, from getting involved in language learners' experience.

Therefore, an effective language immersion teaching environment should provide diverse and engaging learning activities that model pronunciation through text and voiceover audio in the target language. Moreover, an effective language immersion teaching environment should provide tools to translate voiceover audio and text from the target language to a specified language that is familiar to the learner or a mentor to the learner. Importantly, translation tools can facilitate the involvement of mentors to the language learner who are not themselves necessarily proficient in the target language. Additionally, translation tools can enable a learner, either under the direction of a mentor or at their own initiative, to vary the depth of immersion to suit their individual needs.

Technology is an increasingly influential factor in education and offers new opportunities to create powerful learning tools. Multimedia technology provides new ways to engage learners, such as through the creation of an interactive language immersion teaching environment. In such an environment, learners can see visual representations and hear auditory representations of the sounds of a target language as well as words, sentence structures, and conversational patterns. Also, in such an environment, specialized features can facilitate the involvement of mentors so that the learning experience is more collaborative and social. Involved mentors can leverage their experience and knowledge of each learner in order to provide encouragement and guidance. Despite these potentials, current computer-based language immersion learning environments do not provide sufficiently diverse and engaging learning activities that include rich media and voiceover audio. Even more importantly, they do not offer effective translation tools adapted for use by mentors that facilitate mentor understanding, comfort, and involvement.

Disclosed herein, in certain embodiments, are computer-based language immersion teaching systems comprising: a digital processing device that is optionally connected to a computer network, wherein said processing device comprises an operating system configured to perform executable instructions; and a computer program, provided to said digital processing device, including executable instructions that create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language. In some embodiments, the software module for providing translation of voiceover and/or text is adapted to facilitate said mentor in furthering the educational development of said learner. In further embodiments, the software module for providing translation of voiceover and/or text is regulated by said mentor. In further embodiments, the specified language is selected by said mentor. In some embodiments, the software module for providing translation of voiceover and/or text maintains a list of recent voiceovers and/or text, wherein said list provides access to both written and voiced translation of each said recent voiceover and/or text. In some embodiments, the software module for providing translation of voiceover and/or text is further adapted for use by said learner. In further embodiments, access to said software module for providing translation of voiceover and/or text is regulated by said learner. In further embodiments, the specified language is selected by said learner. In some embodiments, the software module for providing translation of said voiceover and/or text is configurable to provide customization of learner immersion by optionally translating one or more of: all voiceover and/or text, voiceover and/or text associated with content of said learning activities, voiceover and/or text associated with instructions for said learning activities, voiceover and/or text associated with navigation within said environment, voiceover and/or text associated with correction and encouragement of said learner, and no voiceover and/or text. In further embodiments, the customization of learner immersion is regulated by said mentor, wherein said mentor determines the types of voiceover and/or text translated. In further embodiments, the customization of learner immersion is regulated by said learner, wherein said learner determines the types of voiceover and/or text translated. In some embodiments, the plurality of learning activities includes one or more activities selected from: art, articles, books, brainstorms, collaborations, compositions, demonstrations, e-books, essays, examinations, games, group activities, journals, laboratory experiments, lectures, multi-player games, music, problem sets, puzzles, quizzes, reading assignments, role-plays, simulations, songs, videos, and worksheets. In some embodiments, the software module for providing translation of voiceover and/or text comprises a feature integrated into the GUI of said language immersion teaching environment. In some embodiments, the software module for providing translation of voiceover and/or text comprises a web browser plug-in, add-in, add-on, or extension. In some embodiments, the software module for providing translation of voiceover and/or text comprises a standalone application. In some embodiments, the software module for providing translation of voiceover and/or text comprises a mobile application. In some embodiments, the target language or said specified language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer readable media encoded with a computer program including instructions executable by the operating system of a digital processing device, wherein said instructions create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language. In some embodiments, the target language or said specified language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

Also disclosed herein, in certain embodiments, are computer-implemented language immersion teaching methods comprising the step of providing executable instructions to a digital processing device comprising an operating system configured to perform executable instructions, to create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language. In some embodiments, the target language or said specified language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In further embodiments, the target language is English.

DETAILED DESCRIPTION OF THE INVENTION

Figure 1:
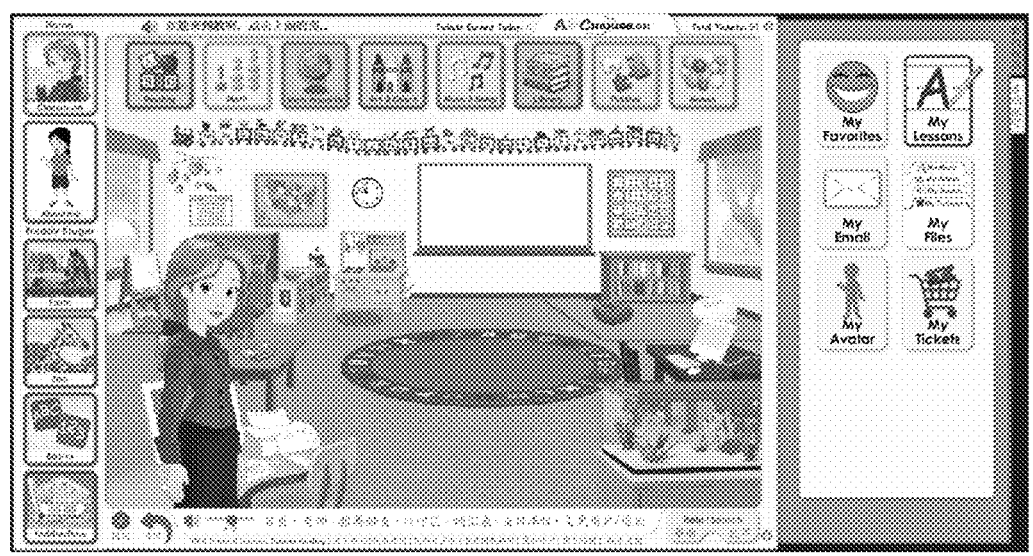
FIG. 1 shows a non-limiting example of a language immersion teaching environment; in this case, an environment representing the metaphor of a classroom, providing access to a plurality of learning activities associated with a target language, and providing access to a software module for translation of voiceover in each learning activity.

Existing computer-based language immersion teaching environments fail to adequately encourage the involvement of mentors, who are not necessarily proficient in the target language, by offering features that facilitate mentors' comfort with and understanding of learning content and awareness of learners' learning experience. Thus, an objective of the systems, products, programs, and methods for language immersion teaching described herein is to provide diverse and engaging learning activities that include rich media such as voiceover audio in the target language. Another objective of the systems, products, programs, and methods disclosed herein is to provide tools to translate voiceover audio and text from the target language to a specified language that is familiar to the learner or a mentor to the learner in order to facilitate deeper mentor involvement and to allow learners to dynamically customize the depth of immersion in their language learning experience.

Disclosed herein, in various embodiments, are computer-based language immersion teaching systems comprising: a digital processing device that is optionally connected to a computer network, wherein said processing device comprises an operating system configured to perform executable instructions; and a computer program, provided to said digital processing device, including executable instructions that create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language.

Also disclosed herein, in various embodiments, are computer readable media encoded with a computer program including instructions executable by the operating system of a digital processing device, wherein said instructions create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language.

Also disclosed herein, in various embodiments, are computer-implemented language immersion teaching methods comprising the step of providing executable instructions to a digital processing device comprising an operating system configured to perform executable instructions, to create a language immersion teaching environment, wherein said environment comprises: a plurality of learning activities associated with a target language; a software module for providing voiceover audio in said target language; and a software module for providing translation of said voiceover and/or text from said target language to a specified language, wherein said translation is both written and voiced, and wherein said software module for providing translation of voiceover and/or text is adapted for use by a mentor to a learner of said target language.

Various Definitions

The term "learner" as used herein, refers to a person who interacts with an educational system for the purpose of gaining knowledge, insight, or understanding of one or more target languages or by virtue of having been allowed, asked, or assigned to interact with an educational system.

The term "mentor" as used herein, refers to a person who has an interest in, or responsibility for, facilitating or furthering the educational development of a learner and includes, by way of non-limiting examples, a parent, step-parent, adoptive parent, foster parent, grandparent, guardian, relative, friend, guide, employer, tutor, instructor, teacher, or professor, of a learner.

As used herein, "target language" means a native, first, second, additional, or foreign language that a learner desires to learn or has been allowed, asked, or assigned to learn for any reason.

As used herein, "immersion" is a method of teaching a target language in which the target language is optionally used for instruction, correction, encouragement, and/or navigation as well as for the content of subject material. Immersion uses the target language as a teaching tool, optionally and variably surrounding or "immersing" learners in the target language.

As used herein, "taxonomy" means a particular classification or organization of a plurality of elements. Taxonomies may arrange elements into groups and may arrange elements or groups in a hierarchical structure (e.g., groups and subgroups). Taxonomies may be comprehensive, classifying all elements within the subject matter, or may be partial, only classifying a portion of the elements within the subject matter.

As used herein, "phoneme" means any of the abstract units of a language that correspond to a set of similar speech sounds which are perceived to be a single distinctive sound in the language.

As used herein, "practice" means a learning method based on repetition of rehearsal or actual engagement in a behavior for the purpose of accomplishing one or more specific educational objectives or to maintain previously acquired skills. Practice may involve presenting a learner with multiple opportunities to see, hear, and/or pronounce phonemes, words, sentences, conversations, or other aspects of a target language.

The term "instructional designer" as used herein, refers to any person who designs and/or evaluates learning activities, and grouped sequences of activities, that are elements of an educational system.

The term "instructional plan" as used herein, refers to a plan, conceived by an instructional designer or a mentor to a learner, designed to accomplish one or more specific educational objectives through the mutual reinforcement of individual learning activities.

The term "standalone application" as used herein, refers to a program that is run as an independent computer process, not an add-on to an existing process. Standalone applications are often compiled and executable.

Language Immersion Teaching Environment

Figure 5:
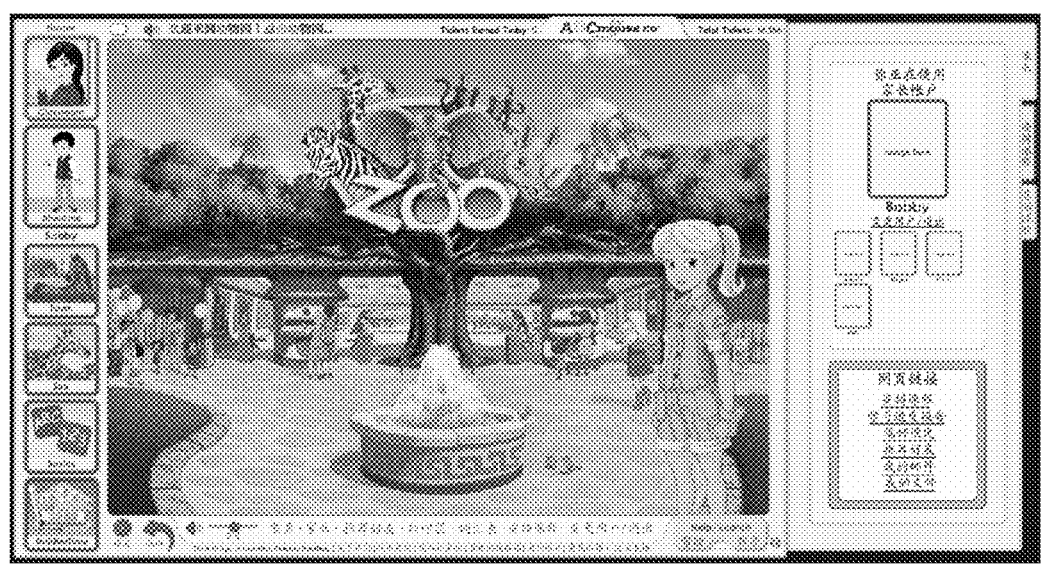
FIG. 5 shows a non-limiting example of a language immersion teaching environment; in this case, an environment representing the metaphor of a zoo, providing access to a plurality of learning activities associated with a target language, and providing access to a software module for translation of voiceover in each learning activity.

The systems, products, programs, and methods for language immersion teaching disclosed herein include a language immersion teaching environment. In some embodiments, a language immersion teaching environment includes a graphic user interface (GUI) that represents a metaphor suitable for language learning. In particular embodiments, the metaphor is a classroom (see e.g., FIG. 1) or a zoo (see e.g., FIG. 5). In some embodiments, the environment further includes a plurality of learning activities associated with a target language. In some embodiments, the environment further includes a software module for providing voiceover audio in the target language. In some embodiments, the environment further includes a software module for providing translation of said voiceover, text, or both voiceover and text from the target language to a specified language which is more familiar to a mentor or a language learner. In further embodiments, the software module provides both written and voiced translation. In still further embodiments, the software module is adapted for use by a mentor. Referring to FIGS. 1 and 5, in particular embodiments, the GUI of the language immersion teaching environment provides access to a plurality of learning activities associated with a target language and provides access to a software module for translation of voiceover in each learning activity.

In some embodiments, the software module for providing voiceover audio in the target language operates in conjunction with the learning activities associated with the target language. In further embodiments, the learning activities and associated voiceovers are designed for use by a language learner. In some embodiments, the software module for providing translation of said voiceover, text, or both voiceover and text from the target language to a specified familiar language is adapted for use by a mentor to a learner, such as a parent or grandparent of a young learner, and designed to facilitate the mentor's comfort and understanding thus promoting their involvement and furthering the educational development of said learner. In some embodiments, the software module for providing translation is adapted for use by a learner and designed to allow a learner to customize the degree of immersion they are exposed to in the language learning environment. In further embodiments, the software module for providing translation is adapted for use by both learners and their mentors.

In some embodiments, the language immersion teaching environments are intranet-based. In some embodiments, the language immersion teaching environments are Internet-based. In further embodiments, the environments are World Wide Web-based. In still further embodiments, the environments are cloud computing-based. In other embodiments, the environments are based on data storage devices including, by way of non-limiting examples, CD-ROMs, DVDs, flash memory devices, magnetic disk drives, and optical disk drives.

Learning Activities

The systems, products, programs, and methods described herein include a plurality of learning activities. In some embodiments, one or more activities are selected from informal activities including, by way of non-limiting examples, demonstrations, how-to-articles, how-to-videos, and simulations. In some embodiments, one or more activities are selected from preschool activities including, by way of non-limiting examples, songs, chants, books, poems, puzzles, games, art activities, and printable activities. In some embodiments, one or more activities are selected from K-12 activities including, by way of non-limiting examples, books, games, puzzles, art, music, reading assignments, articles, videos, demonstrations, simulations, quizzes, examinations, worksheets, problem sets, brainstorms, and journals. In some embodiments, one or more activities are selected from higher education activities including, by way of non-limiting examples, books, reading assignments, lectures, articles, videos, demonstrations, simulations, mock examinations, quizzes, examinations, essays, laboratory experiments, problem sets, brainstorms, and journals. In some embodiments, one or more activities are selected from professional activities including, by way of non-limiting examples, books, articles, brainstorms, collaborations, group activities, multi-player games, videos, lectures, role-plays, simulations, demonstrations, quizzes, and exams.

In some embodiments, the plurality of activities is organized according to an instructional plan designed to accomplish one or more educational objectives in a target language through the mutual reinforcement of individual activities. In further embodiments, an instructional plan interconnects two or more activities associated with a subject in such a way that understanding is built progressively with one or more activities adding to the educational messages of one or more previous activities. In some embodiments, an instructional designer constructs an instructional plan. In other embodiments, a mentor to a learner constructs an instructional plan. In other embodiments, a software module constructs an instructional plan according to the requirements of one or more published educational standards.

In some embodiments, the instructional plan is based on a taxonomy of phonemes in a target language. In further embodiments, the instructional plan comprises a progression of educational objectives including teaching phoneme sounds, phoneme sounds in the context of the beginning, middle, and end of words, word families, vocabulary in the context of environments or themes, sentence structures, and common conversational patterns. In some embodiments, the plurality of activities includes activities designed to accomplish one or more educational objectives related to teaching sounds of phonemes and teaching phonemes in the context of the beginning, middle, and end of words. In some embodiments, the plurality of activities includes activities designed to accomplish one or more educational objectives related to teaching one or more word families. In some embodiments, the plurality of activities includes activities designed to accomplish one or more educational objectives related to teaching vocabulary in the context of a particular environment or theme. In some embodiments, the plurality of activities includes activities designed to accomplish one or more educational objectives related to teaching sentence structures and common conversational patterns.

In various embodiments, an instructional plan addresses, by way of non-limiting examples, a lesson, a learning unit, and a level of study. In some embodiments, an instructional plan addresses a lesson, which is one or more learning activities that teach toward a specific educational objective or a specific element of a published educational standard. In some embodiments, an instructional plan addresses a learning unit, which is one or more lessons that teach toward a general educational objective or a general element of a published educational standard. In some embodiments, an instructional plan addresses a level of study, which is one or more learning units that teach toward a plurality of general educational objectives or an overarching element of a published educational standard.

In some embodiments, learning activities include visual and audio content, for example, text, images, video, audio, motion, interactivity, and animation. In further embodiments, interactive content allows a learner to interact with the learning activity through text, hyperlinks, graphical icons and other visual elements, manipulation of graphical elements, auditory elements, and motion elements. In view of the disclosure provided herein, learning activities are created by techniques known to those of skill in the art using machines, software, and languages known to the art. Those of skill in the art will recognize that several digital multimedia formats are suitable including, by way of non-limiting examples, Flash®, QuickTime®, Real Media®, Windows Media®, Silverlight®, Java™, HTML 5, XHTML 5, Unity®, Audio Video Interleave (AVI), and Moving Pictures Expert Group (MPEG).

Target Language

The systems, products, programs, and methods described herein include a plurality of learning activities associated with a target language. In some embodiments, a target language is a language that a learner desires to learn or has been allowed, asked, or assigned to learn. In further embodiments, a target language is the native or first language of a learner. In other embodiments, a target language is a second, additional, or foreign language. In various embodiments, the target language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. Suitable target languages include those that are new to a learner, those with which the learner has some familiarity, those with which a learner has proficiency, and those in which a learner is fluent, but is motivated to refine their language skills.

In some embodiments, the learning activities described herein include, by way of non-limiting examples, text, images, video, audio, motion, interactivity, and animation in the target language. In further embodiments, audio includes voiceover audio in the target language. In some embodiments, text, images, video, audio, motion, interactivity, and animation in the target language are used for content of the subject material. In some embodiments, text, images, video, audio, motion, interactivity, and animation in the target language are used for, by way of non-limiting examples, instruction, correction, encouragement, and navigation.

Voiceover Audio

The systems, products, programs, and methods described herein provide a language immersion teaching environment. Immersion is a method of teaching a target language in which the target language is optionally used for instruction, correction, encouragement, and/or navigation in addition to the content of subject material. Accordingly, the systems, products, programs, and methods described herein include spoken word or voiceover audio in a target language. In some embodiments, the systems, products, programs, and methods described herein include a software module for providing voiceover audio. In some embodiments, spoken word or voiceover audio includes, by way of non-limiting examples, a single recorded voice, recorded conversations between two people, recorded conversations between more than two people, animal sounds, nature sounds, singing, music, and sound effects. In some embodiments, voiceover audio is associated with other media including, by way of non-limiting examples, text, images, video, motion, interactivity, animation, or combinations thereof. In further embodiments, the voiceover audio is synchronized with video, motion, interactivity, animation, or combinations thereof.

In some embodiments, spoken word or voiceover audio is used to instruct a learner or a mentor to a learner. In further embodiments, spoken word or voiceover audio is used to explain how to use software modules, content features, and learning activities. In some embodiments, spoken word or voiceover audio is used to correct a learner when they submit an incorrect response to a learning activity. In further embodiments, spoken word or voiceover audio is used to alert the learner of an incorrect response and provide an example of a more correct response. In some embodiments, spoken word or voiceover audio is used to encourage a learner. In further embodiments, spoken word or voiceover audio is used to congratulate and praise. In some embodiments, spoken word or voiceover audio is used to help a learner or a mentor navigate a computer-based environment. In further embodiments, spoken word or voiceover audio is used to indicate the function of links, buttons, and other navigational elements.

In some embodiments, spoken word or voiceover audio comprises the subject matter of one or more learning activities. In further embodiments, spoken word or voiceover audio is used to model or demonstrate the sounds of phonemes in a target language and their proper pronunciation. In still further embodiments, spoken word or voiceover audio is used to provide practice recognizing phonemes and their sounds within the beginning, middle, and end of words, and joining the sounds to form words as well as breaking words down into phonemes. In some embodiments, spoken word or voiceover audio is used to model or demonstrate, by way of non-limiting examples, vocabulary, sentence structures, and common conversational patterns in a target language.

In light of the disclosure provided herein, those of skill in the art will recognize that several digital audio formats are available for computer-based delivery of spoken word or voiceover audio. These include, by way of non-limiting examples, uncompressed audio formats, such as WAV, AIFF, AU, and PCM; formats with lossless compression, such as FLAC, Monkey's Audio, WavPack, Shorten, TTA, ATRAC Advanced Lossless, Apple® Lossless, MPEG-4, and Windows Media® Audio Lossless; and formats with lossy compression, such as MP3, Vorbis, Musepack, AAC, Real Audio, ATRAC, and Windows Media® Audio Lossy. Audio compression is a form of data compression designed to reduce the transmission bandwidth requirement of digital audio and the storage size of audio files. Audio compression algorithms are implemented in computer software as audio codecs (a truncation of compressor-decompressor or coder-decoder). In some embodiments, spoken word audio is compressed. In further embodiments, audio data is compressed with a lossless codec. In still further embodiments, audio data is compressed with a lossless codec to varying degrees familiar to those of skill in the art. In further embodiments, audio data is compressed with a lossy codec. In still further embodiments, audio data is compressed with a lossy codec to varying degrees familiar to those of skill in the art. In other embodiments, spoken word audio is uncompressed. In some embodiments, spoken word or voiceover audio is included in video or multimedia content. In further embodiments, audio is included in media formats including, by way of non-limiting examples, Windows Media Video (WMV), Motion Picture Experts Group (MPEG), Audio Video Interleave (AVI), QuickTime®, Real Media®, Windows Media®, Flash®, Silverlight®, Java™, HTML 5, XHTML 5, and Unity®.

Translation of Voiceover Audio or Text

Figure 4:
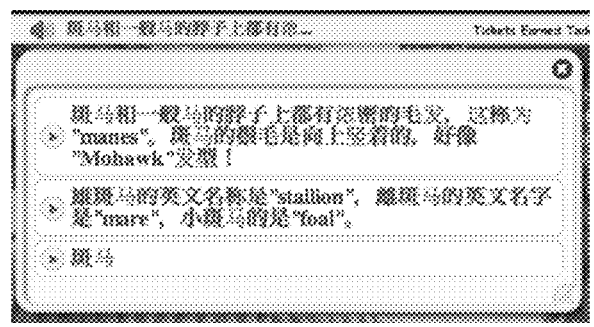
FIG. 4 shows a non-limiting example of a software module for translation of voiceover; in this case, a software module for written and voiced translation of voiceover, which maintains a running list of recent voiceovers.

The systems, products, programs, and methods described herein include a software module for providing translation of voiceover and/or text from a target language to a specified language. In some embodiments, the software module for providing translation of voiceover and/or text translates voiceover or text, or both voiceover and text associated with, by way of non-limiting examples, instruction, correction, encouragement, navigation, or language learning content. In further embodiments, voiceover and/or text is associated with a learning activity or with a language immersion teaching environment. In some embodiments, the translation is written. In some embodiments, the translation is voiced. In other embodiments, the translation is both written and voiced. In some embodiments, the software module provides access to written and voiced translation of the most recently played voiceover or the most recently displayed text. In other embodiments, the software module maintains a list of recently played voiceovers and recently displayed text and provides access to written and voiced translation of each (see e.g., FIG. 4). In further embodiments, the software module provides ready access to translation of the most recent voiceover or text and provides, through further interaction, access to translation of a list of additional recent voiceovers and/or text (see e.g., FIG. 4). In further embodiments, a list of translations of recent voiceovers, text, or both, includes translations of the most recent 2, 3, 4, 5, 6, 7, 8, 9, 10, 20, 30, 40, or 50 voiceovers and/or text. In still further embodiments, translations of voiceover and text are accessed by interaction with, for example, an image, icon, text, or link, or other GUI element. In still further embodiments, translations of voiceover and text are accessed by interactions including, for example, click with a pointing device such as a mouse, trackpad, or trackball, tap or other gesture with a touchscreen or multitouch screen, keystroke, or voice command.

In some embodiments, the software module for providing translation of voiceover and/or text produces a written translation by selecting appropriate text data from among a collection of stored data. In various embodiments, text data is stored in formats including, by way of non-limiting examples, Rich Text Format (RTF) and TXT. In further embodiments, text data is encoded according to Unicode or American Standard Code for Information Interchange (ASCII) standards. In some embodiments, the software module for providing translation of voiceover and/or text produces a voiced translation by selecting an appropriate audio data file from among a collection of stored data files. In various embodiments, audio data is stored in formats including, by way of non-limiting examples, MP3, WAV, AIFF, AU, Apple® Lossless, MPEG-4, Windows Media®, Vorbis, AAC, and Real Audio®. In further embodiments, text and audio data files are stored in an electronic repository such as one of the several databases known to the art.

Mentor involvement is often an important factor in the success of a language learning activity and often a factor in the overall success of a language immersion teaching environment. A mentor often provides encouragement and motivation in learning a language, even in cases where the mentor is not necessarily fluent or proficient in the target language. In some embodiments, the software module for providing translation of voiceover and/or text is adapted for use by a mentor. In further embodiments, the software module is adapted to facilitate a mentor's promotion of the educational development of a learner. In further embodiments, a mentor selects the specified language into which the software module translates voice and text content. In still further embodiments, a mentor selects a specified language, for example, by use of a pre-populated menu or by text entry, either within the module or in a separate settings or preferences area of a language immersion teaching environment. In various embodiments, the specified language is, by way of non-limiting examples, English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, That, Burmese, Malay, Telugu, Javanese, and Tagalog. In some embodiments, a mentor regulates access to the software module. In further embodiments, a mentor turns the software module on or off. In further embodiments, a mentor configures in which areas, sections, views, screens, or pages of the environment the software module is available.

Some learners also benefit from the ability to customize their learning experience. In some embodiments, the software module for providing translation of voiceover and/or text is further adapted for use by a learner. In further embodiments, the software module is adapted to facilitate a learner's ability to customize the degree of immersion in the environment. In further embodiments, a learner selects the specified language into which the software module translates voice and text content. In still further embodiments, a learner selects a specified language, for example, by use of a pre-populated menu or by text entry, either within the module or in a separate settings or preferences area of a language immersion teaching environment. In some embodiments, a learner regulates their own access to the software module. In further embodiments, a learner turns the software module on or off. In further embodiments, a learner configures in which areas, sections, views, screens, or pages of the environment the software module is available.

In some embodiments, the software module for providing translation of voiceover and/or text is configurable to provide customization of learner immersion by optionally translating voiceover and/or text based on the type, content, or purpose of the voiceover and/or text. In further embodiments, the software module is configurable to translate all voiceover and/or text. In still further embodiments, the software module is optionally configurable to translate voiceover and/or text associated with content of learning activities. In still further embodiments, the software module is optionally configurable to translate voiceover and/or text associated with instructions for learning activities. In still further embodiments, the software module is optionally configurable to translate voiceover and/or text associated with navigation within the environment. In still further embodiments, the software module is optionally configurable to translate voiceover and/or text associated with correction and encouragement of a learner. In still further embodiments, the software module is optionally configurable to translate no voiceover and/or text. In some embodiments, the software module is configurable to translate any combination of the types of voiceover and/or text described herein. In further embodiments translation of voiceover content is configured separately from translation of text content. In further embodiments, a mentor to a language learner configures the types of content translated by the module. In other embodiments, a learner configures the types of content translated by the module.

In light of the disclosure provided herein, those of skill in the art will recognize that in various embodiments a software module for providing translation of voiceover and/or text is implemented in a multitude of ways. In some embodiments, the software module is accessible from every area, sections, view, screen, or page of the language immersion teaching environment described herein. In other embodiments, the software module is accessible from select areas, sections, views, screens, or pages of the environment. In further embodiments, the software module is accessible from areas, sections, views, screens, or pages of the environment including voiceover or text pertaining to, by way of non-limiting examples, instruction, correction, encouragement, navigation, language learning content, or any combination thereof. In some embodiments, the software module for providing translation of voiceover and/or text is a feature integrated into the GUI of the language immersion teaching environment described herein. In further embodiments, the software module is accessible by interacting with a link or icon integrated into the GUI of the environment. In further embodiments, the software module is in a layer or level above the GUI of the environment.

Figure 2:
FIG. 2 shows a non-limiting example of a software module for translation of voiceover; in this case, a software module for written and voiced translation of English voiceover in a learning activity to Mandarin Chinese.
Figure 3:
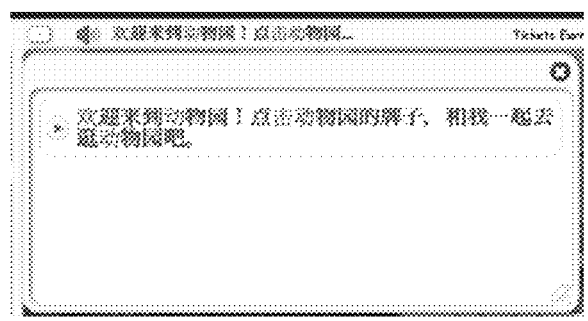
FIG. 3 shows a non-limiting example of a software module for translation of voiceover; in this case, a software module for written and voiced translation of voiceover, which includes full-length translations revealed by interacting with an icon or a truncated translation.

Referring to FIGS. 1 and 5, in particular embodiments, a software module for providing translation is integrated into the language immersion teaching environment (see also isolated close-up example in FIG. 2). A written translation of the most recently played voiceover is displayed. In cases where the most recently played voiceover is lengthy, the written translation is potentially truncated. Further, a voiced translation of the most recently played voiceover is available by interacting with a speaker icon. Now referring to FIG. 3, in particular embodiments, full-length written and voiced translations of the most recently played voiceover are available by clicking on the text of the written translation. Now referring to FIG. 4, in particular embodiments, the software module provides access to a list of written and voiced translations of the several most recently played voiceovers.

In some embodiments, the software module for providing translation of voiceover and/or text comprises a web browser plug-in, add-in, add-on, or extension. In further embodiments, a web browser, plug-in, add-in, add-on, or extension is accessible via, by way of non-limiting examples, click, right click, menu selection, keystroke, touchscreen gesture, or voice command. In some embodiments, the software module for providing translation of voiceover and/or text comprises a standalone application, which is a program that is run as an independent computer process, not an add-on to an existing process. In further embodiments, a standalone application providing translation is compiled and executable. In some embodiments, a standalone application is in communication with and adapted for use in conjunction with a language learning activity or a language immersion teaching environment, which is implemented separately. In some embodiments, the software module for providing translation of voiceover and/or text comprises a mobile application. In further embodiments, a mobile application is in communication with and adapted for use in conjunction with a language learning activity or a language immersion teaching environment, which is implemented separately.

Digital Processing Device

The systems, products, programs, and methods described herein include a digital processing device. The digital processing device includes one or more hardware central processing units (CPU) that carry out the device's functions. The digital processing device further comprises an operating system configured to perform executable instructions. In some embodiments, the digital processing device further comprises a memory device, a display, an input device, and optionally a sound output device. In some embodiments, the digital processing device is connected to the Internet such that it accesses the World Wide Web. In other embodiments, the digital processing device is connected to an intranet. In other embodiments, the digital processing device is connected to a data storage device. In some embodiments, the digital processing device is a non-portable device, such as a server or a desktop computer. In other embodiments the digital processing device is a portable device, such as a laptop or tablet computer. In other embodiments the digital processing device is a mobile device, such as a smartphone or digital music player.

The digital processing device includes an operating system configured to perform executable instructions. The operating system is, for example, software, including programs and data, which manages the device's hardware and provides services for execution of applications. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the digital processing device includes a memory device. The memory is one or more physical apparatus used to store data or programs on a temporary or permanent basis. In some embodiments, the memory is volatile and requires power to maintain stored information. In some embodiments, the memory is non-volatile and retains stored information when the digital processing device is not powered.

In some embodiments, the digital processing device includes a visual display. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is a plasma display. In other embodiments, the display is a video projector. In still further embodiments, the display is a combination of devices such as those disclosed herein.

In some embodiments, the digital processing device includes an input device. In some embodiments, the input device is a keyboard or keypad. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera to capture motion or visual input. In still further embodiments, the input device is a combination of devices such as those disclosed herein.

In some embodiments, the digital processing device optionally includes a sound output device. In some embodiments, the sound output device is a pair of headphones, earphones, or ear buds. In some embodiments, the sound output device is an electro-acoustic transducer or loudspeaker. In further embodiments, the sound output device is a flat panel loudspeaker, a ribbon magnetic loudspeaker, or a bending wave loudspeaker. In other embodiments, the sound output device is a piezoelectric speaker. In still further embodiments, the sound output device is a combination of devices such as those disclosed herein.

In accordance with the description provided herein, suitable digital processing devices include, by way of non-limiting examples, server computers, desktop computers, laptop computers, notebook computers, tablet computers, netbook computers, smartbook computers, subnotebook computers, ultra-mobile PCs, handheld computers, personal digital assistants, Internet appliances, smartphones, music players, and portable video game systems. Those of skill in the art will recognize that many mobile smartphones are suitable for use in the system described herein. Suitable tablet computers include those with booklet, slate, and convertible configurations, known to those of skill in the art. Suitable portable video game systems include, by way of non-limiting examples, Nintendo DS™ and Sony® PSP™.

Computer Network

The systems, products, programs, and methods disclosed herein include a digital processing device that is optionally connected to a computer network. A computer network is a collection of computers and/or devices interconnected by communications channels that facilitate communications among users and allow users to share resources. In view of the disclosure provided herein, the computer network is created by techniques known to those of skill in the art using hardware, firmware, and software known to the art. In some embodiments, the computer network is a private network such as an intranet. In some embodiments, the computer network is the Internet. In further embodiments, the Internet provides access to the World Wide Web and the computer program and/or mobile application is provided to the digital processing device via the Web. In still further embodiments, the Internet provides access to the World Wide Web and the computer program and/or mobile application is provided to the digital processing device via cloud computing. In other embodiments, the computer network comprises data storage devices including, by way of non-limiting examples, CD-ROMs, DVDs, flash memory devices, solid state memory, magnetic disk drives, magnetic tape drives, optical disk drives, cloud computing systems and services, and the like. In further embodiments, the computer program and/or mobile application is provided to the digital processing device via a data storage device.

Computer Readable Medium

In some embodiments, the systems, products, programs, and methods disclosed herein include one or more computer readable media encoded with a program including instructions executable by the operating system of an optionally networked digital processing device. In further embodiments, a computer readable medium is a tangible component of a digital processing device. In still further embodiments, a computer readable medium is optionally removable from a digital processing device. In some embodiments, a computer readable medium includes, by way of non-limiting examples, CD-ROMs, DVDs, flash memory devices, solid state memory, magnetic disk drives, magnetic tape drives, optical disk drives, cloud computing systems and services, and the like.

Computer Program

The systems, products, programs, and methods disclosed herein include at least one computer program. The computer program includes a sequence of instructions, executable in the digital processing device's CPU, written to perform a specified task. Those of skill in the art will recognize that the computer program may be written in various versions of various languages. In some embodiments, the computer program comprises one sequence of instructions. In some embodiments, the computer program comprises a plurality of sequences of instructions. In some embodiments, the computer program is delivered from one location. In other embodiments, the computer program is delivered from a plurality of locations. In some embodiments, the computer program is delivered from a cloud computing service. In various embodiments, the computer program comprises, in part or in whole, one or more web applications, one or more mobile applications, one or more standalone applications, one or more web browser plug-ins, extensions, add-ins, or add-ons, or combinations thereof.

Web Application

In some embodiments, the computer program includes a web application written in one or more markup languages, style languages, client-side scripting languages, server-side coding languages, or combinations thereof. In some embodiments, the computer program is written to some extent in a markup language such as Hypertext Markup Language (HTML), Extensible Hypertext Markup Language (XHTML), or eXtensible Markup Language (XML). In some embodiments, the computer program is written to some extent in a style language such as Cascading Style Sheets (CSS). In some embodiments, the computer program is written to some extent in a client-side scripting language such as Asynchronous Javascript and XML (AJAX), Actionscript, Javascript, or Silverlight®. In some embodiments, the computer program is written to some extent in a server-side coding language such as Active Server Pages (ASP), ColdFusion®, Perl, Java™, Hypertext Preprocessor (PHP), Python™, and Ruby. In some embodiments, the computer program utilizes a web framework such as Ruby on Rails (RoR) or .NET. In some embodiments, the computer program is written to some extent in a query language such as Structured Query Language (SQL). In some embodiments, the computer program utilizes a database system such as Microsoft® SQL Server, mySQL™, and Oracle®.

In some embodiments, the language immersion teaching environment is implemented as a web application. In further embodiments, the learning activities associated with a target language are implemented as part of a web application. In further embodiments, the software module for providing translation of voiceover, text, or voiceover and text from a target language to a specified language is part of a web application. In further embodiments, the software module for providing voiceover audio is part of a web application.

Mobile Application

In some embodiments, the computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, the mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Those of skill in the art will also recognize that mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone® and iPad® (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

In some embodiments, the language immersion teaching environment is implemented as a mobile application. In some embodiments, the learning activities associated with a target language are implemented as one or more mobile applications. In some embodiments, the software module for providing translation of voiceover, text, or voiceover and text from a target language to a specified language is implemented as a mobile application. In some embodiments, the software module for providing voiceover audio is implemented as a mobile application.

Standalone Application

In some embodiments, the computer program includes a standalone application, which is a program that is run as an independent computer process, not an add-on to an existing process, e.g. not a plug-in. Those of skill in the art will recognize that standalone applications are often compiled. A compiler is a computer program(s) that transforms source code written in a programming language into binary object code such assembly language or machine code. Suitable compiled programming languages include, by way of non-limiting examples, C, C++, Objective-C, COBOL, Delphi, Eiffel, Java™, Lisp, Visual Basic, and VB .NET, or combinations thereof. Compilation is often performed, at least in part, to create an executable program. In some embodiments, the computer program includes one or more executable complied applications.

In some embodiments, the language immersion teaching environment is implemented as a standalone application. In some embodiments, the learning activities associated with a target language are implemented as one or more standalone applications. In some embodiments, the software module for providing translation of voiceover, text, or voiceover and text from a target language to a specified language is implemented as a standalone application. In some embodiments, the software module for providing voiceover audio is implemented as a standalone application.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, sub-notebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

In some embodiments, the software module for providing translation of voiceover, text, or voiceover and text from a target language to a specified language is implemented as a web browser extension, plug-in, add-in, or add-on. In some embodiments, the software module for providing voiceover audio is implemented as a web browser extension, plug-in, add-in, or add-on.

Software Modules

The systems, products, programs, and methods disclosed herein include, in various embodiments, software, server, and database modules. In view of the disclosure provided herein, the software modules are created by techniques known to those of skill in the art using machines, software, and languages known to the art. In some embodiments, the software modules are in one computer program or application. In other embodiments, the software modules are in more than one computer program or application. In some embodiments, the software modules are hosted on one machine. In other embodiments, the software modules are hosted on more than one machine. In some embodiments, the software modules are hosted on one or more machines in one location. In other embodiments, the software modules are hosted on one or more machines in more than one location.

EXAMPLES

The following illustrative examples are representative of embodiments of the systems, products, programs, and methods described herein and are not meant to be limiting in any way.

Example 1

A 12-year-old girl in Singapore, who is a native speaker of Mandarin Chinese, would like to learn to speak, read, and write English. After researching several language learning tools, the girl favors the idea of using a web-based language immersion teaching environment. The girl's parents provide her access to a web application that offers over three hundred interactive learning activities. She accesses the web application on her netbook computer that is connected to the World Wide Web. The learning activities are designed to engage young learners and include interactive formats such as games, puzzles, songs, and art activities, each designed to achieve an educational objective related to teaching an aspect of English such as phonemes, words, sentence structures, and conversational patterns. The environment even includes some multi-player games that enable the girl to engage and learn with other English language learners in her region. The web application presents an immersion teaching environment; therefore, the language learning activities include text, images, animation, video, and audio content in English and also use English to deliver instructions, navigational cues, praise, and correction. As a beginning English learner, the girl enjoys listening to songs that frequently repeat English sounds and words; however, she has trouble figuring out how to play some of the games in the immersive environment, especially the more complex multi-player games.

Example 2

Referring to the family in Example 1, the girl's parents observe her English studies with interest. Because they do not speak or understand much English themselves, they decide to use a software module offered by the language immersion teaching environment for translation of the text and voiceover in the learning activities so that they can assist her learning and ensure that the content is age appropriate. Her mother logs onto a mentor-only area of the web application and activates the translation module. She configures it to translate all text and voiceover presented in learning activities from English to Mandarin. Each time a learning activity presents text or voiceover such as subject matter content, instructions, navigational cues, praise, or correction, the software module for translation provides a Mandarin text translation. A recorded Mandarin audio translation is associated with each text translation and available by interacting with an audio icon. A translation of the most recent English text presented or voiceover played is presented on the GUI of the language immersion teaching environment. Additionally a list of translations for the ten most recent English items is available by interacting with the text of the most recent translation. With the translation module active the girl's parents are able to join her for a few minutes each time she starts a session with the language immersion teaching environment. Her parents are able to help her select learning activities that suit her and figure out how to play the more complex multi-player games. Additionally, her parents are able to confirm that the content is age appropriate.

What is claimed is:

1. A computer-based language immersion teaching system comprising:
   (a) a digital processing device that is optionally connected to a computer network, wherein said processing device comprises an operating system configured to perform executable instructions; and
   (b) a computer program, provided to the digital processing device, including executable instructions that create a language immersion teaching environment, the environment comprising:
      i. a plurality of learning activities associated with a target language;
      ii. a software module for providing voiceover audio in the target language; and
      iii. a software module for providing translation of voiceovers recently played in the language immersion teaching environment and text recently displayed in the language immersion teaching environment from the target language to a specified language, the specified language selected by the mentor and different from the target language, the software module for providing translation maintaining a list comprising translation of at least 2, at least 5, or at least 10 voiceovers recently played in the language immersion teaching environment and text recently displayed in the language immersion teaching environment, the list providing access to both written and voiced translation of each voiceover and text voiceover recently played in the language immersion teaching environment and text recently displayed in the language immersion teaching environment, the software module for providing translation adapted for use by a human mentor to a learner of the target language.

2. The computer-based system of claim 1, wherein access to said software module for providing translation of voiceover, text, or voiceover and text is regulated by said mentor.

3. The computer-based system of claim 1, wherein said software module for providing translation of voiceover, text, or voiceover and text is further adapted for use by said learner.

4. The computer-based system of claim 3, wherein access to said software module for providing translation of voiceover, text, or voiceover and text is regulated by said learner.

5. The computer-based system of claim 1, wherein said software module for providing translation is configurable to provide customization of learner immersion by translating voiceover, text, or voiceover and text associated with one or more of: all content, learning content, instructions, correction, encouragement, and navigation, wherein the software module for providing translation is further configurable to provide customization of learner immersion by translating no voiceover or text.

6. The computer-based system of claim 5, wherein said customization of learner immersion is regulated by said mentor, wherein said mentor determines the types of voiceover, text, or voiceover and text translated.

7. The computer-based system of claim 5, wherein said customization of learner immersion is regulated by said learner, wherein said learner determines the types of voiceover, text, or voiceover and text translated.

8. The computer-based system of claim 1, wherein said plurality of learning activities includes one or more activities selected from: art, articles, books, brainstorms, collaborations, compositions, demonstrations, e-books, essays, examinations, games, group activities, journals, laboratory experiments, lectures, multi-player games, music, problem sets, puzzles, quizzes, reading assignments, role-plays, simulations, songs, videos, and worksheets.

9. The computer-based system of claim 1, wherein said software module for providing translation of voiceover, text, or voiceover and text comprises a feature integrated into the GUI of said language immersion teaching environment.

10. The computer-based system of claim 1, wherein said software module for providing translation of voiceover, text, or voiceover and text comprises a web browser plug-in, add-in, add-on, or extension.

11. The computer-based system of claim 1, wherein said software module for providing translation of voiceover, text, or voiceover and text comprises a standalone application.

12. The computer-based system of claim 1, wherein said software module for providing translation of voiceover, text, or voiceover and text comprises a standalone application.

13. The computer-based system of claim 1, wherein said target language or said specified language is one or more of: English, Spanish, Italian, Portuguese, French, Dutch, Polish, German, Russian, Ukrainian, Mandarin, Wu, Cantonese, Hindi, Punjabi, Bengali, Marathi, Urdu, Arabic, Turkish, Tamil, Farsi, Japanese, Korean, Vietnamese, Thai, Burmese, Malay, Telugu, Javanese, and Tagalog.

14. The computer-based system of claim 13, wherein said target language is English.

15. Non-transitory computer readable media encoded with a computer program including instructions executable by the operating system of a digital processing device, wherein said instructions create a language immersion teaching environment, the environment comprising:
   (a) a plurality of learning activities associated with a target language;
   (b) a software module for providing voiceover audio in the target language; and
   (c) a software module for providing translation of voiceovers recently played in the language immersion teaching environment and text recently displayed in the language immersion teaching environment from the target language to a specified language, the specified language selected by the mentor and different from the target language, the software module for providing translation maintaining a list comprising translation of at least 2, at least 5, or at least 10 voiceovers recently played in the language immersion teaching environment and text recently displayed in the language immersion teaching environment, the list providing access to both written and voiced translation of each voiceover recently played in the language immersion teaching environment and text recently displayed in the language immersion teaching environment, the software module for providing translation adapted for use by a human mentor to a learner of the target language.

16. A computer-implemented language immersion teaching method comprising the step of providing executable instructions to a digital processing device comprising an operating system configured to perform executable instructions, to create a language immersion teaching environment, the environment comprising:
   (a) a plurality of learning activities associated with a target language;
   (b) a software module for providing voiceover audio in the target language; and (c) a software module for providing translation of voiceovers recently played in the language immersion teaching environment and text recently displayed in the language immersion teaching environment from the target language to a specified language, the specified language selected by the mentor and different from the target language, the software module for providing translation maintaining a list comprising translation of at least 2, at least 5, or at least 10 voiceovers recently played in the language immersion teaching environment and text recently displayed in the language immersion teaching environment, the list providing access to both written and voiced translation of each voiceover recently played in the language immersion teaching environment and text recently displayed in the language immersion teaching environment, the software module for providing translation adapted for use by a human mentor to a learner of the target language.

\* \* \* \* \*

UNITED STATES PATENT AND TRADEMARK OFFICE
CERTIFICATE OF CORRECTION

| | | |
|---|---|---|
| PATENT NO. | : 8,740,620 B2 | Page 1 of 1 |
| APPLICATION NO. | : 13/301639 | |
| DATED | : June 3, 2014 | |
| INVENTOR(S) | : Dohring et al. | |

It is certified that error appears in the above-identified patent and that said Letters Patent is hereby corrected as shown below:

In the claims

Column 20, line 21, Claim 12, please delete "standalone" and replace it with --mobile--

Signed and Sealed this
Twenty-second Day of March, 2016

Michelle K. Lee
*Director of the United States Patent and Trademark Office*